Jan. 29, 1963

A. B. BISHOP 3RD 3,075,700

AUTOMATIC PROCESS CONTROL

Filed June 6, 1960

INVENTOR
Albert B. Bishop
BY Anthony D. Gennamo

Jan. 29, 1963

A. B. BISHOP 3RD 3,075,700

AUTOMATIC PROCESS CONTROL

Filed June 6, 1960

INVENTOR
Albert B. Bishop
BY Anthony D. Gennaro

United States Patent Office 3,075,700
Patented Jan. 29, 1963

3,075,700
AUTOMATIC PROCESS CONTROL
Albert B. Bishop 3d, Columbus, Ohio, assignor to Industrial Nucleonics Corporation, a corporation of Ohio
Filed June 6, 1960, Ser. No. 34,149
6 Claims. (Cl. 235—151)

This invention relates generally to automatic control of processes in which a plurality of different variables are available for control and manipulation in order to produce a desired result. In particular, the invention provides a control system relating the properties and characteristics of a product with a plurality of process variables which are involved in producing the product to achieve feedback of error signals which are distributed to control individual process variables in a manner to optimize the control function in relation to all of the variables.

Automatic process controls are currently in use in the manufacture of a wide variety of products. The general form of automatic control of a process comprises a device for measuring some characteristic of the product being produced and, by means of a feedback servo loop, this measured characteristic is compared with a desired product specification of that characteristic to produce an error signal which initiates a correction of a process variable which controls that characteristic. While systems of this nature have produced considerable improvement in some processes, they have been limited by the fact that the control is exercised relative to a single process variable and the system therefore must be designed to compensate by means of the selected process variable for all changes in the product properties. In a simple process this arrangement produces satisfactory results within certain limits but for complex processes the desired product properties may be best obtained or, as in some processes, are only obtainable by the proper manipulation and relative adjustment of a plurality of process variables. In the past, the control of complex processes has, in general, been best accomplished with the aid of a highly skilled human operator who, through long experience and intimate knowledge of the process involved, has been able to make the correct combination of control corrections in the process variables to achieve a desired product property. In an effort to instrument the control of a plurality of process variables the use of computers to evaluate the product properties and apply the appropriate control signals to individual variables in the process has in some instances replaced the skilled human operator.

The disadvantages of existing industrial control systems are due, in part, to the lack of flexibility which is inevitable when any and all changes in the product properties must be compensated by control of a single process variable. Automatic control systems of this type, therefore, have been limited to relatively simple operations where the product characteristic which is measured can be rather simply related to a particular and readily controlled process variable. More complex processes requiring the simultaneous control of a plurality of process variables have, in the past, been considered beyond the scope of application for a single process variable controller. In an attempt to bring such processes within the realm of feasible automatic control systems employing computers for making decisions as to which process variable should be adjusted have been proposed. In systems of this type the computer is programed in relation to a study of the complete process to be controlled and a set of predetermined conditions are established which permit the computer to make decisions as to which process variable should be adjusted based on measured product properties and the existing value of the process variables. Systems of this type are relatively complex and require considerable study and evaluation of the system to be controlled in order to establish the criteria for programing the computer. A further and more serious disadvantage of control systems of this type results from the absence of any effective ability of the control system to adapt itself to changing conditions which may not have been contemplated when the system was established. The inability to cope with such a condition will, in general, result in a shutdown of the process or a production of unusable output product until such shutdown has been effected. Furthermore, there exist at present extremely complex processes in which computer control of the entire process has not been achieved.

It is a principal object of the present invention to provide method and apparatus for process control in which control applied to a plurality of process variables is optimized in relation to each variable to produce desired product properties resulting from the process.

A further feature of the invention resides in the computation of a distribution function by which the error signal computed from a measured product property can be applied to selected process variable controllers in the manner best adapted to control the product property and reduce the error measured therein to zero regardless of the instantaneous value of said distribution function. This arrangement accomplishes a further object of the invention in that the variation measured in the product property is corrected by the application of control signals to that process variable best suited to correct such product property variation irrespective of the original source of the product property variation. Thus whether a controlled or an uncontrolled variable is responsible for a product property variation, the correction will be applied to that controller which is best capable of accomplishing a correction for the uncontrolled variable.

It is a specific object of the present invention to provide computation of the relationship between variations in process variables and product properties and to correct the variations in the product properties which deviate from a norm by the application of correction signals to the process variable controllers in accordance with the computation. As a particular object, the simultaneous computation of the variances of the process variables and the covariances between the process variables and the product properties is made, and control of the individual process variables is effected in accordance with a specified function of the individual variances and covariances.

The variance of a variable, as is well known in the field of statistics, is a measure of the spread or deviation of the variable from its average or expected value. Specifically, it is the second moment of the distribution around its mean. Similarly, the covariance between two variables is a measure of the interdependence between the two variables, i.e., the correspondence between the deviation of one variable from its mean and the deviation of the second variable from its mean. The covariance is defined statistically as the joint moment about their respective means of the product of two variables. The correlation coefficient relating two variables is a normalized measure of covariation, defined as the covariance divided by the square root of the product of the variances of the individual variables. In a process consisting of "$n$" controllable process variables and a single product variable, a surface in $(n+1)$-dimensional space relating the average value of the product variable to the $n$ process variables is defined as a "regression surface." If a linear relationship exists between the product variable and each of the process variables, this surface will be a hyperplane. The slope of the intersection of the hyperplane with each plane defined by the product-variable axis and one of the process-variable axes is known as a "regression coefficient." In processes where the process variables are mutually independent, the regression coefficient of the product variable on a particular process variable is equal to the covariance between the two variables divided by the variance of that process variable.

In a preferred embodiment of the present invention an industrial process having a plurality of controllable process variables and a number of uncontrollable process variables all of which affect the properties of the product produced by the process is controlled for continuous production of the product. The product properties which are of interest are detected by suitable means and compared with the product specification for the generation of an error signal for automatic control purposes. This error signal is distributed by a proportioning circuit which utilizes the regression coefficients of the product property on each of the controllable process variables in such a way that the total correction made in any product property is equal to the error sensed in that property. The distribution function is computed in the following manner. The product property which is detected is a function of time since the product being produced is manufactured or formed in a continuous manner. The controllable process variables likewise are functions of time and will exhibit variational signals corresponding to incremental changes of the process variables about the established level which is set for the control of the process. The detection of the variational signals corresponding to the incremental variation of the process variables provides signals which are a function of time which are by suitable means individually summed, squared, and cross-multiplied with the product property function which is obtained as a result of detecting the measured product property. The individual squares and cross-products are corrected by subtraction of suitable functions of the mean value of the signal well known in the field of statistics to obtain the individual variances and covariances, respectively. The covariance between each product property and each controllable process variable is divided by the variance of that process variable. The resulting quotients are squared and the squares are added to produce a total covariance-to-variance ratio-function which is the sum of the squares of the individual regression coefficients. The ratio of the individual regression coefficients to this total covariance-to-variance ratio-function is a measure of the relative sensitivity of the particular controllable process variable in correcting the variation in the product property detected. Accordingly, the error signal detected for the product produced is apportioned to the individual controllers for the controllable process variables in accordance with the ratio of the individual ratio-function computed from that variable to the total ratio-function for all the controlled variables. In this manner the process is controlled with correction signals applied to that controllable process variable to which the detected variation error in the output product is most sensitive or the combination of process variables so situated is employed.

The foregoing objects and advantages of the present invention and other additional objects and advantages will be more readily understood by reference to the following detailed description taken in conjunction with the accompanying drawings wherein.

Figure 1:
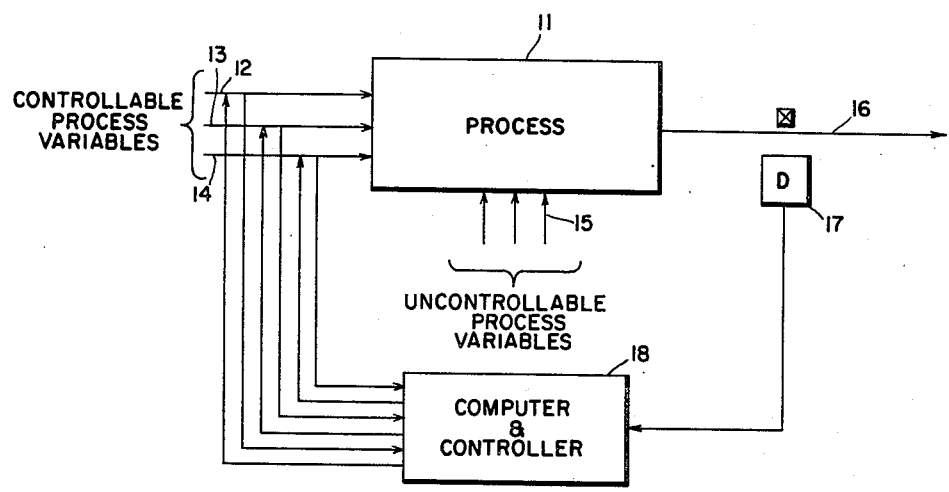
FIG. 1 is a block diagram of a generalized control system in accordance with the present invention.

Referring now to FIG. 1 a process is performed by suitable means represented as a device 11 to which is applied a plurality of inputs 12, 13, and 14 representative of the controllable process variables.

In addition to the controllable variables 12, 13, and 14 the process apparatus 11 is subject to a plurality of uncontrollable variables 15 which may include such influences as ambient temperature and pressure conditions, raw materials variations, or perturbations in any other conditions which have an effect on the properties of the product produced by the process 11. It will be apparent that the number of controllable variables will vary for different processes and the number of such variables which are actually controlled will be subject to choice based on quality control, economic considerations and other factors.

In the operation of the process controlled by the device 11 the plurality of controllable process variables 12, 13, and 14 in conjunction with the uncontrollable process variables 15 operate to produce an output product 16, the characteristics of which are influenced in varying degrees by the factors affecting the process. For the purpose of automatic control the characteristics of the product 16 may be examined by any suitable means and one or more particular product characteristics translated by a suitable detector 17 into an electrical signal which represents the measured characteristic as a function of time since the product 16 is passing continuously past the detector 17. The signal from detector 17 is applied in accordance with the invention to a computer 18 which has inputs applied thereto from the controllable process variables 12, 13, and 14. The inputs to the computer 18 from the variables 12, 13, and 14 are also functions of time derived from suitable transducers associated with the process variables. The computer 18 is arranged to compute the variation in the signal derived from each of the process variables 12, 13, and 14 and the relation, if any, between the variational signal derived from the detector 17 and the individual signals derived from one or more of the process variables 12, 13, and 14. The computer also generates an error signal by comparing the signal from detector 17 with the product specification which is set in the computer 18 and thus provides an error signal representing the desired change in the product 16. In conventional automatic control systems the error signal is applied to a controller to change a process variable in a sense which will tend to reduce the error signal to zero. In accordance with the present invention the error signal is distributed in accordance with the relation computed between the product property signal from detector 17 and the process variables signals 12, 13, and 14 and applied to change the appropriate process variables 12, 13 and 14 in a magnitude corresponding to the relative values of the individual covariance-to-variance ratio-functions relating process variables and product variations. With this arrangement the correction to the process to produce the desired result in the product 16 is applied to the appropriate one of the variables 12, 13, and 14 or the appropriate combination thereof in relative magnitude which is most likely to achieve the desired result.

A particular computation which provides a measure of the relation between variables is the cross-correlation function defined as:

$$\phi_{12}(\tau) = \lim_{T \to \infty} \frac{1}{T} \int_{-T/2}^{T/2} f_1(t) \cdot f_2(t-\tau) \, dt \qquad (1)$$

In Equation 1 the functions $f_1$ and $f_2$ are different functions of time $(t)$ and $\tau$ is a time lag which is the variable of $\phi_{12}(\tau)$.

In instrumenting the computation of a cross-correlation function between real-time variables several simplifications are required which, however, do not prevent the computation from yielding a useful result indicating the correlation between the integrand functions. As instrumented the calculation is generally of the form:

$$\phi_{12}(t,\tau)=\frac{1}{T}\int_{-t-T}^{t}f_1(t).f_2(t-\tau)dt \qquad (2)$$

The differences between 1 and 2 are that in 2 the period of integration is finite and is taken over an interval from some point of time in the past to the present. These changes permit the computation of cross-correlation to be performed for the present or past values of the integrand variables and a reliable result is obtained if the period of integration T is long in comparison to the lag $\tau$.

The covariance between $f_1$ and $f_2$ is computed from:

$$\sigma_{12}^2(t,\tau)=\phi_{12}(t,\tau)-\bar{f}_1(t).\bar{f}_2(t-\tau) \qquad (3)$$

where $$\bar{f}_1(t)=\frac{1}{T}\int_{t-T}^{t}f_1(t)dt \qquad (4)$$

and $$\bar{f}_2(t-\tau)=\frac{1}{T}\int_{t-T}^{t}f_2(t-\tau)dt \qquad (5)$$

The variance of a function, $f_1$, may be similarly defined as:

$$\sigma_2^2(t,\tau)=\frac{1}{T}\int_{t-T}^{t}[f_2(t-\tau)]^2 dt-[f_2(t-\tau)]^2 \qquad (6)$$

Should the functions representing all other variables in the system be linearly independent of the variable generating $f_2$, the regression coefficient relating variables 1 and 2 in a multivariate regression of variable 1 on 2 and the remaining variables is given by:

$$b_{12}(t,\tau)=\frac{\sigma_{12}(t,\tau)}{\sigma_2^2(t,\tau)} \qquad (7)$$

which is a measure of the incremental change in 1 which would be caused by a unit change in 2 under the system conditions existing at time $t$. From the relationships presented in Equations 2 through 7, $b_{12}(t,\sigma)$ can be expressed in the following computational form:

$$b_{12}(t,\tau)$$

$$=\frac{\int_{t-T}^{t}f_1(\bar{t})f_2(\bar{t}-\tau)dt-\frac{1}{T}\left[\int_{t-T}^{t}f_1(\bar{t})d\bar{t}\right]\left[\int_{t-T}^{t}f_2(\bar{t}-\tau)dt\right]}{\int_{t-T}^{t}[f_2(\bar{t}-\tau)]^2 d\bar{t}-\frac{1}{T}\left[\int_{t-T}^{t}f_2(\bar{t}-\tau)d\bar{t}\right]^2} \qquad (8)$$

Various arrangements are known for making the computation of Equation 8 and can be utilized as a portion of the computer 18 of FIG. 1. The control of the process variables 12, 13, and 14 in response to the value of the cross-correlation computed can be carried out with any of the well-known controllers used for particular variables and the distribution of the regression coefficient values to the individual controllers can be normalized and modified as desired for any particular process.

Figure 2:
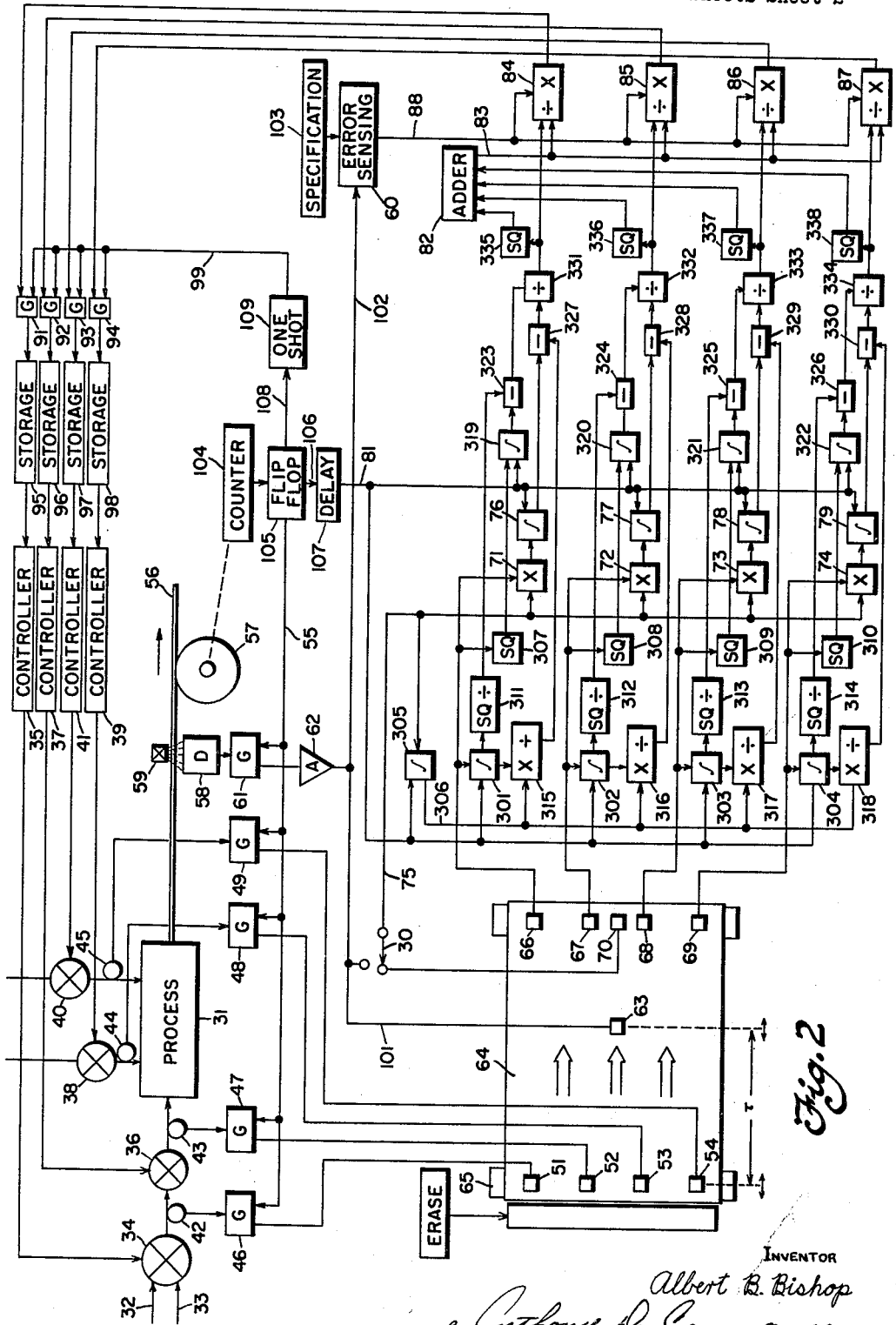
FIG. 2 is a block diagram of a process subject to automatic control providing correction of the process.

Referring now to FIG. 2, a control system is shown for a generalized process in which corrections are applied to a plurality of the controllable process variables in accordance with the invention so that the portions of the total correction which are effected by adjustment of each process variable are in direct proportion to the regression coefficient relating the product property to that process variable. In this way, assurance is obtained that the total correction will equal the error sensed. A process apparatus or means for manufacturing or forming a product is indicated at 31. The process 31 may have a number of controllable process variables associated therewith. For example, the raw material for the process may be supplied in varying proportion from lines 32, 33 by means of a differential control such as a valve 34 which is operated from an ingredient controller 35. The rate of material is supplied to the input of the process may be under the control of a device 36 which is operated to control the material supply rate by a controller 37. Any number of other variables in the process 31 may be controlled such as, for example, a pressure control means 38 operated by a pressure controller 39 and a temperature control 40 operated by a temperature controller 41. Obviously, other variables than the ones named could be controlled by appropriate means known in the art for controlling the particular variables selected to control the process 31. In each instance the controllers 35, 37, 39, 41 would provide appropriate mechanical, electric, hydraulic, or other control operation of the means controlling the variable in response to an appropriate input signal. The controllers 35, 37, 39, 41 operate in conjunction with suitable circuits for establishing, set point, sensitivity and other adjustments and means for determining the input signals all of which are well known in the control art.

For the purpose of deriving information relative to the controlled variables, a plurality of transducers are provided for producing electrical signals which indicate the variation in the controlled variables as a function of time. For sensing the composition of the raw materials a transducer 42 is positioned to sense the output of mixing device 34, and for determining the rate of flow of material a transducer 43 is positioned to sense the material output rate of control valve 36. In similar manner a pressure transducer 44 senses the pressure condition of the process controlled by pressure control device 38 and a temperature sensor 45 derives a signal representative of the temperature controlled by device 40. The transducers 42–45 are connected, respectively, to gate circuits 46, 47, 48, 49 which apply the transducer signals to recording heads 51, 52, 53, 54 selectively in accordance with a gating signal applied over line 55. The signal applied on line 55 is applied simultaneously to gates 46, 47, 48, 49 and when so applied renders the gates conditioned to pass signals from the transducers 42–45 to the respective recording heads 51–54.

The output of the process 31 produces a product 56 which is produced in a continuous manner and removed from the device 31 by suitable conveying means 57 in any well known fashion. The product property of the product 56 which it is desired to control is sensed by a transducer 58 which may be of the type employing a penetrative radiation source 59 that the radiation from which passes through the product 56. Any other product property sensing device which generates a satisfactory analog signal may of course be used in place of the radiation type gauge shown. Signals representative of the product property being controlled are derived from the transducer 58 and applied through a gate circuit 61 to an amplifier 62, the output of which applies signals to a recording head 63 and an error comparison circuit 60. The gate 61 is operated by the same control signals applied on line 55 which operate gates 46–49. The position of the recording head 63 or of the recording heads 51–54 or both is adjustable in the direction shown, the purpose of which will be described hereinafter.

The recording heads 51–54 and 63 operate with respect to a recording medium 64 such as a magnetic tape driven at uniform speed by means of rollers 65. The tape 64 provides individual bands or channels on which the recording heads can record magnetic variations corresponding to the signals applied to the individual recording heads with the magnetic variations providing a spatial function along the individual bands corresponding to the function of time of the electrical input signal to the respective recording heads. With this arrangement the input signals to the recording heads may be recovered as functions of time from a set of reading heads 66, 67, 68, 69, and 70 which are positioned in a row across the tape 64 at a position adjustably spaced from the recording heads 51–54 and recording head 63. The signal read by read head 66 is applied to integrator 301, to squaring circuit 307, and to multiplier 71. In the same manner, the signal read by read head 67 is applied to 302, 308, and 72, and similarly for the signals at the remaining read heads. The signal read by read head 70, which corresponds to that recorded by recording head 63, is applied via a switch 30 in the position shown to integrator 305 and to all of the multiplier units 71–74 by a common input line 75. The alternative position of switch 30 connects the output of the amplifier 62 directly to the line 75 as an alternative means of producing lag.

The output of integrator 301 is applied to squaring-divider circuit 311 and to multiplier-divider circuit 315. In the same manner, the output of integrator 302 is applied to 312 and 316, and similarly for the outputs of 303 and 304. Squaring-divide circuits 311–314 square the integrated signal from integrators 301–304 and, by convenient means known to the art, divide the squared signal by a constant proportional to the period of integration. The output of integrator 305 is applied, through common line 306, to all of the multiplier-divider circuits 315–318. Circuits 315, 316, 317, and 318 multiply the integrated product-property signal by the integrated process-variable signal from 301, 302, 303, and 304, respectively, and divide the resulting quotients by a constant proportional to the period of integration.

The outputs of squaring circuits 307, 308, 309, and 310 are applied to integrators 319, 320, 321, and 322, respectively. The outputs of 319, 320, 321, and 322 are applied to subtractors 323, 324, 325, and 326, respectively. Here the outputs of 311, 312, 313, and 314 are subtracted from the outputs of 319, 320, 321, and 322, respectively. The outputs of multipliers 71, 72, 73, and 74, where the signal from read-head 70 is multiplied by the signals from read-heads 66, 67, 68, and 69, respectively, are applied to integrators 76, 77, 78, and 79, respectively. The outputs of 76, 77, 78, and 79 are applied to subtractors 327, 328, 329, and 330, respectively. Here the outputs of 315, 316, 317, and 318 are subtracted from the outputs of 76, 77, 78, and 79, respectively.

The outputs from 327 are applied to divider 331 where it is divided by the output of 323. In like manner, the output of 328 is applied to 332, where it is divided by the output of 324. Dividers 333 and 334 function in similar manner for the outputs of 329 and 325 and of 330 and 326, respectively. The outputs of 331, 332, 333, and 334 are squared by the circuits 335, 336, 337, and 338, respectively, and the resulting output signals from squaring circuits 335–338 applied to an adder circuit 82 which produces at line 83 the sum of the signals applied to the input thereof. Line 83 is common to all divider-multiplier units 84–87. The individual outputs of 331, 332, 333, and 334 are applied, respectively, to divider-multiplier circuits 84, 85, 86, and 87 for division by the signal applied at line 83 and multiplication by the signal applied at a line 88, also common to all of the divider-multipliers 84–87.

The integrators 76–79, 301–305, and 319–322 may be of the type providing a capacitor in accordance with the input signal to obtain a voltage signal across the capacitor proportional to the integral of the input signal. Circuits for this purpose are well known in the art and are generally provided with either a mechanical or electrical connection for discharging the capacitor at the end of the integration period. This may be accomplished by the application of a common signal on line 81 to actuate a switch closure or an electrical circuit for discharging the storage capacitor.

The outputs of the multiplier-divider circuits 84–87 are applied through gate circuits 91, 92, 93, 94 to storage devices 95, 96, 97, 98. The storage devices 95–98 may be any suitable circuit for maintaining a signal at the level last applied thereto such as rebalancing potentiometers, "box-car" generators or other appropriate means. The storage devices 95–98 are connected to the appropriate controllers 35, 37, 39, 41 for operating the respective controllers to a control condition corresponding to the level established in the storage devices. To maintain the quantity set in the storage devices 95–98 the gates 91–94 are normally deconditioned. Thus the gates 91–94 do not pass signals unless an enabling signal is applied thereto over a common line 99.

The signals and control voltages for the control of the operation of the system of the present invention are supplied to various portions of the circuit as hereinafter described. From the output of amplifier 62 a line 101 supplies signals detected by the detector 58 to the recording head 63. A line 102 supplies similar signals to an error detector device 60 which has applied thereto in suitable form a measure of the desired product specification from device 103. The comparison of the desired product specification quantity from device 103 and the signal applied to device 60 from line 102 produce a difference signal therebetween on line 88 which is a measure of the error in the product property detected by the detector 58. The integration performed by the present circuit may be over any adequate period determined for example by a counter 104 which may be operated from a standard timing source or may be operated from a drive from the material conveyor 57, if sufficiently constant. The counter 104 is adapted to emit a pulse after a predetermined number of counts or may be set to have two counting periods corresponding to the integrating period and the interval between integrating periods, which two periods may be unequal if desired. The output of the counter 104 for either condition produces a pulse at the beginning and end of the integrating period and this pulse is applied to a flip-flop multivibrator 105 which has the characteristic of changing state for each input pulse applied thereto. The line 55 is connected to an output of multivibrator 105 to enable the gates 46, 47, 48, 49, and 61 for the duration of the integration period to pass signals therethrough. A similar output is applied to line 106 for enabling the integrators 76–79, 301–305, and 319–322 by removing the short-circuiting condition across the integrating capacitors thereof, as previously explained, during the period of integration. The signal on line 106 is applied to a delay device 107 which delays for a predetermined period the application of a signal on line 81 to remove the short circuiting condition on the integrating capacitors and this delays the instant when integration begins. The output signals from flip-flop 105 are applied on line 108 to a single shot multivibrator 109. The pulse on the line 108 is adapted to trigger the multivibrator 109 only when the multivibrator 105 returns to its Off condition corresponding to the interval between integration periods. This may be accomplished by a suitable connection to the flip-flop 105 to select a signal having the proper polarity to trigger the single shot 109 only for the condition when multivibrator 105 is triggered to the Off state. The single shot 109 provides a brief output pulse and returns to its stable state after being triggered. This brief output pulse applied on line 99 enables gates 91–94 to pass signals applied at the inputs thereof from the multiplier and divider circuits 84–87 to the storage devices 95–98. The storage devices 95–98, therefore, are supplied with signals only during the brief interval when single shot multivibrator 109 is producing an output pulse.

The operation of the system of FIG. 2 during a typical integration interval will now be described. Assume the process to be in progress with the product 56 issuing from the device 31 and a property of the product 56 is being measured by the devices 59, 58. The transducers 42, 43, 44, 45 are applying suitable signals to the inputs of gates 46, 47, 48, 49 which signals progress no further until the receipt of an enabling pulse to the gates on line 55. At the beginning of the integration interval the counter 104 issues a pulse to trigger multivibrator 105 into its On condition thereby applying an enabling gate to line 55 to permit gates 46, 47, 48, 49, 61 to pass signals to the respective recording heads 51, 52, 53, 54, and 63. The position of recording heads 51–54 relative to head 63 is set to correspond to the lag interval $\tau$ which is to be introduced into the correlation computation. The outputs read by the read heads 66–69 are applied to the integrators 301–304, the squaring circuits 307–310, and the multipliers 71–74 with the signal from read head 70 applied through switch 30 to integrator 305 and to line 75 as a common input to all the multipliers. The output of squaring circuits 307–310 is zero until their inputs are supplied with signals. The output of multipliers 71–74 is zero until both inputs are supplied with signals. The squaring circuit inputs and both the multiplier inputs are supplied with signals upon the arrival at the read heads 66–69 of the initial signals recorded on recording heads 51–54. At this time the signals in the read heads 66–69 correspond to the initial time $(t-\tau)$. The read head 70 at the same time is reading a signal which corresponds to the time $t$. The signal resulting from the squaring of the input quantities applied to each squaring circuit 307–310 is applied for integration to integrators 319–322. The product resulting from the multiplication of the two input quantities applied to each of the multipliers 71–74 is applied for integration to the integrators 76–79. The time delay introduced by the recording tape 64 moving from the recording heads to the read heads sufficiently delays the output of the squaring circuits 307–310 and of the multipliers 71–74 for the delay device 107 to have passed the signal applied on line 106 to the line 81 and all of the integrators, therefore, are ready for integration to start from a zero value. The integrated signals from the integrators 301–304 are applied to multiplier-dividers 314–318 where each is multiplied by the integrated signal from read head 70 integrated in integrator 305 and applied to 315–318 on common line 306. The products resulting from the multiplication of the integrated signals are divided in the divider circuits in devices 315–318 by a constant proportional to the period of integration T set by the time between the first and second pulses of counter 104. The resulting quotients are applied to subtractors 327–330 where they are subtracted from the integrated products from the integrators 76–79 to form the numerators of the regression coefficients:

$$\int_{t-T}^{t} f_1(t)f_2(t-\tau)dt - \frac{1}{T}\int_{t-T}^{t} f_1(t)dt \int_{t-T}^{t} f_2(t-\tau)dt \quad (9)$$

where $f_2(t)$ is any one of the process signals applied to reading heads 66–69 and $f_1(t)$ is the product signal applied to reading head 70. In similar fashion, the integrated signals from the integrators 301–304 are applied to squaring-dividers 311–314 where the integrated signals are squared and the squares of the integrals divided by a constant proportional to the period of integration T set by the time between the first and second pulses of counter 104. The resulting quotients are applied to subtractors 323–326 where they are subtracted from the integrated squared signals from the integrators 319–322 to form the denominators of the regression coefficients:

$$\int_{t-T}^{t} [f_2(t-\tau)]^2 dt - \frac{1}{T}\left[\int_{t-T}^{t} f_2(t-\tau)dt\right]^2 \quad (10)$$

The outputs of 327–330, which constitute the numerators of the regression coefficients, are applied to dividers 331–334 where they are divided by the outputs of 323–326, which constitute the denominators of the regression coefficients. The resulting quotients, which constitute the regression coefficients, are applied to the squaring circuits 335–338 and the resulting squares of the coefficients are applied to adder 82 to obtain the sum thereof. The outputs of dividers 331–334 are also applied to divider-multiplier circuits 84–87 with the result that the output of each circuit 84–87 is proportional to the error signal on line 88 and the ratio of the individual regression coefficient divided by the sums of the squares of all the regression coefficients. These fractions of the error signal are applied on the appropriate lines to the gate circuits 9–94. Explicity, if the regression coefficient output of divider 331 is $b_1$, of divider 332 is $b_2$, of divider 333 is $b_3$, and of divider 334 is $b_4$, then the sum of the squares is $$B = b_1^2 + b_2^2 + b_3^2 + b_4^2 \quad (11)$$

If the error signal on line 88 is $\epsilon_T$, then the fractional error signal appearing on the output of unit 84 is $$\xi_1 = \frac{b_1}{B} \cdot \xi_T$$

Similarly, the output of 85 is $$\xi_2 = \frac{b_2}{B}\xi_T$$

and for units 86 and 87

$$\xi_3 = \frac{b_3}{B}\xi_T$$

$$\xi_4 = \frac{b_4}{B}\xi_T$$

The end of the integration interval is initiated by the second pulse issuing from counter 104 which triggers the multivibrator 105 into its Off condition thus disabling gates 46, 47, 48, 49, and 61 and triggering single shot multivibrator 109 to issue an enabling pulse to gates 91–94. The enabled gates 91–94 pass the input signals thereto to the storage devices 95–98 since the integration quantities on integrators 76–79 are maintained for the period of delay device 107 after the second pulse issues from counter 104. During this delay interval the input derived from the tape 64 continues due to the recorded signal existing on the portion of the tape 64 between the recording and read heads, and the integration thereof continues prior to the appearance on line 81 of the delayed signal from line 106. During this interval the multivibrator 109 enables the gates 91–94 to transfer the result of the completed regression computation in devices 84–87 into storage in devices 95–98, thus adding the signals from 84–87 to those already stored in 95–98. When the delayed signal appears on line 81 the integrators are reset to zero awaiting the start of the next integration cycle. This reset operation is timed to occur after the multivibrator 109 returns to its stable state and again deconditions the gates 91–94 in order that the zeroing of the integrators 76–79 will not change the correction signals stored in devices 95–98. These storage signals operate the controllers 35, 37, 39, and 41 to control the controllable process variables operated by controls 34, 36, 38, and 40 as a function of the relative sensitivity of those controls on the output product 56 as determined by the regression-coefficient computation. By this process the controls are applied to those variables most likely to produce an efficient correction. Furthermore, the proper total correction is obtained since, at least for small changes in the process variables, the inputs to recording heads 51–54 are mutually independent, so that the total correction, $\Delta Y$, in the product property 56 resulting from the error $\xi_T$ is equal to $$\Delta Y = b_1\xi_1 + b_2\xi_2 + b_3\xi_3 + b_4\xi_4$$

$$\Delta Y = b_1\left(\frac{b_1}{B}\xi_T\right) + b_2\left(\frac{b_2}{B}\xi_T\right) + b_3\left(\frac{b_3}{B}\xi_T\right) + b_4\left(\frac{b_4}{B}\xi_T\right)$$

$$\Delta Y = (b_1^2 + b_2^2 + b_3^2 + b_4^2)\frac{\xi_T}{B}$$

$$\Delta Y = B \cdot \frac{\xi_T}{B}$$

$$\Delta Y = \xi_T$$

By the intermittent integration process used, the system of FIG. 2 can be applied to control procedures which require different times for effecting the desired change in the respective controlled process variables.

Figure 3:
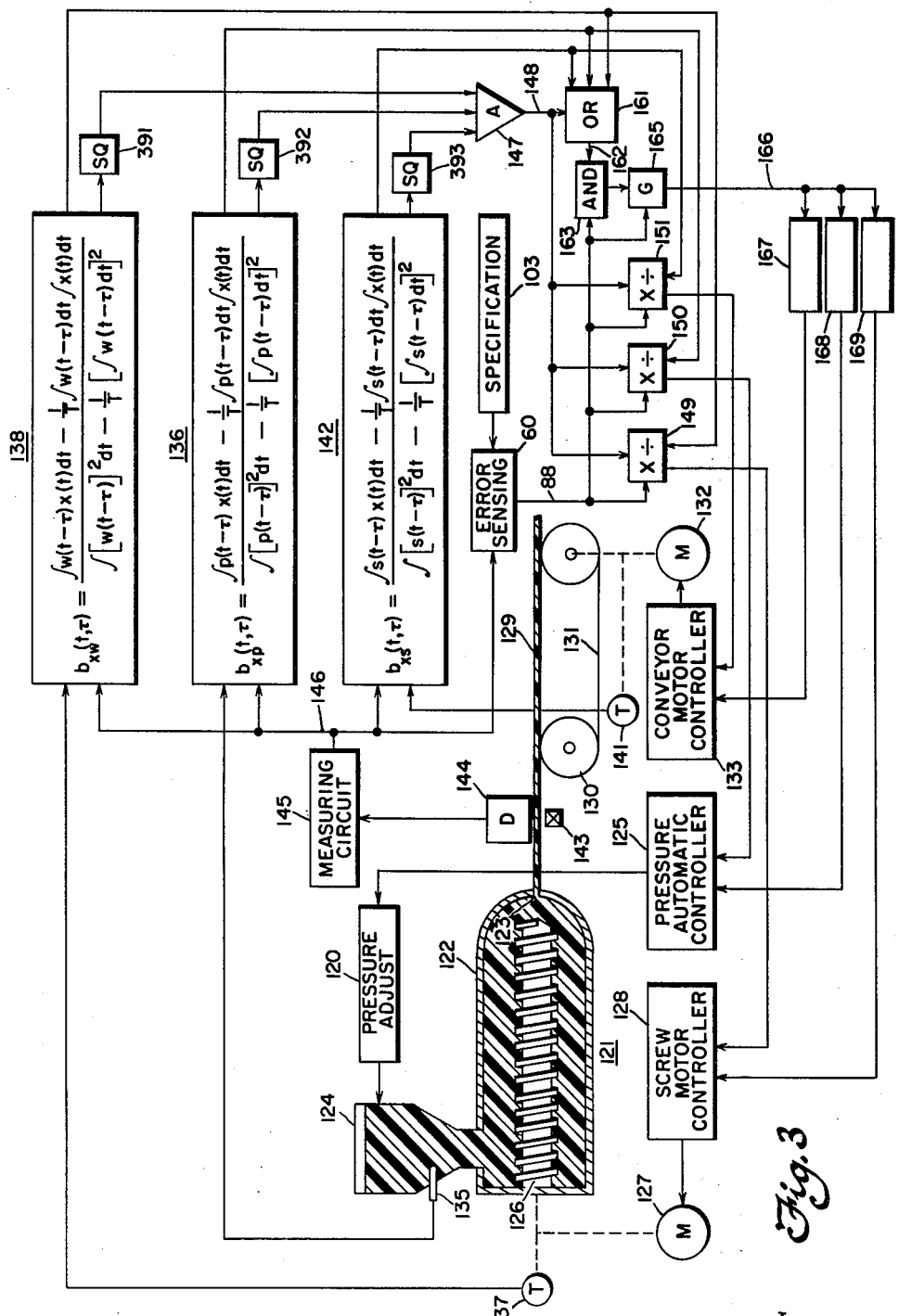
FIG. 3 is a block diagram of a modified automatic process control providing continuous correction signals.

Referring now to FIG. 3, a control system in accordance with the present invention is shown applied to control a plastic extrusion process. A conventional plastic extrusion machine generally indicated at 121 comprises an elongated housing 122 having an orifice 123 at one end thereof of the desired cross-sectional area corresponding to the shape of the material to be extruded. Material is supplied to the interior of the housing 122 from a suitable feed hopper 124, the material therein being pressure fed by a controllable pressure device 120 controlled by a pressure controller 125. Extrusion of the plastic material is partially under the control of a relatively large diameter screw 126 centrally located in the housing 122 and rotatably driven at a controllable speed by a motor 127, the speed of which is variably controlled by a motor controller 128. The plastic extrusion process produces an output product 129 in continuous form and the product 129 is removed from the region of the orifice 123 by a take-away conveyor 130 which suitably provides a moving conveyor belt 131. The properties of the product 129 produced by operation of the extruder 121 are controlled by a number of factors. For a given composition of material and temperature of operation however, the factors of pressure in the supply hopper 124, the speed of rotation of the lead screw 126 and the speed of the take-away conveyor 131 all are readily controllable to influence the properties of the product 129, in particular the physical dimensions thereof. All of these variables are subject to control the pressure in hopper 124 being controlled by the pressure adjusting means 120 controlled by the controller 125, the speed of lead screw 126 being determined by the speed of the motor 127 controlled by the motor controller 128 and the speed of take-away conveyor 131 being determined by the speed of motor 132 under the control of the conveyor motor controller 133. These three variables therefore may be selected as process variables for controlling the product properties of the product 129 by application of appropriate signals to the input of controllers 125, 128, 133.

For the purpose of regression coefficient control a sensor for each of the process variables to be controlled is provided. In hopper 124 a pressure transducer 135 is provided, the electrical signal derived therefrom being applied to a pressure regression-coefficient computer 136. The speed of lead screw motor 127 is detected by a tachometer 137 and the electrical signal therefrom representative of speed of motor 127 is applied to a screw speed regression-coefficient computer 138. The take-away speed of the conveyor 130 is detected by a tachometer 141 and the electrical signal representative of take-away conveyor speed is applied to a take-away speed regression-coefficient computer 142. The regression coefficients computed in the computers 136, 138, and 142 are performed in relation to a property of the product 129 which may be the thickness property thereof determined by a radiation source 143 and detector gauge 144 or any other suitable gauge for the property of the product 129 which is to be controlled. The electrical signal corresponding to the thickness from the gauge 144 may be applied to conventional measuring equipment 145 and is also applied as an electrical signal to all of the regression computers 136, 138, and 142 by a connection on line 146. The multiplication and integration of the input functions to the regression computers may be performed in any known manner and the integration carried over a sufficient period and selected delay $\tau$ to permit any significant correlation between the signals to be determined.

These quantities from computers 136, 138, 142 are squared in squaring circuits 392, 391, and 393, respectively, and the squares added in a summing amplifier 147 to produce a quantity proportional to the sums of the squares of the regression coefficients. This sum function is applied on line 148 as a divisor to each of a plurality of divider-multiplier devices 149, 150, 151. Each of these devices has two multiplier input terminals to one of which is applied the regression coefficient from the respective regression computers 138, 136, and 142. The other multiplier input of each unit 149, 150, 151 is supplied with an error signal derived from a subtraction device 60 which compares the product specification from device 103 with the detected product property from gauge 144. Accordingly, the output of the multiplier division devices 149, 150, 151 is a fractional part of the error signal, the fraction being determined by the ratio of the individual regression-coefficient magnitude to the sum of the squares of all of the regression coefficients. These signals are applied to the respective controllers, the signal from the multiplier-divider 149 being applied to controller 128, the signal from multiplier-divider 150 being applied to controller 125, and the signal from multiplier-divider 151 being applied to conveyor motor controller 133.

Figure 4:
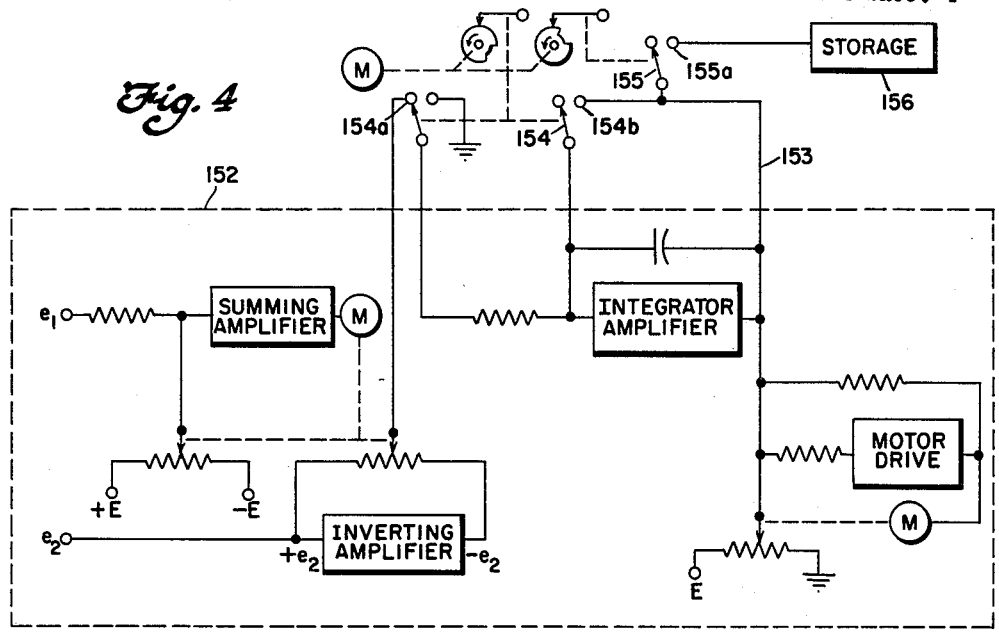
FIG. 4 is a block diagram partly schematic of one form of correlation computer.

Continuous control with the system of FIG. 3 can be readily achieved by operating the integrators in the regression circuits 136, 138, 142 over a sufficient integration time to include the variations inherent in the process being monitored. The integrators may be reset periodically at the end of each integration interval and the value of the integral stored until the next integrated value is received. This may be accomplished in any suitable manner, as previously described. One arrangement for this purpose is shown in FIG. 4 wherein an integrator 152, as disclosed in U.S. Patent No. 2,866,899, is indicated within the dotted line. The integrator 152 provides at output line 153 a voltage proportional to the integral of the product of voltages $e_1$ and $e_2$ applied to the input terminals thereof. This integrator may be operated periodically by means of a switch 154 having contacts 154a and 154b which are actuated by a cam or other mechanism to alternately make contact with contacts 154a and 154b. This switch action provides for the integration of the quantities $e_1$ and $e_2$ for contact with 154a and discharges the integration capacitor for contact with 154b. The integrated quantity may be supplied to a storage device 156 by means of a switch 155 making contact with contact 155a. The storage device 156 may be a capacitor to accept the voltage from contact 155a due to the low source impedance of line 153 and store the same without change for all periods when contact 155a is open. At the end of the integration interval, but before the contact 154b contacts switch 154 to discharge the integration capacitor, the contact 155a is opened by suitably shaping the cam actuator for switch 155. The opening of contact 155a prevents change in the stored signal value in storage device 156 until switch 155a again is contacted. Obviously, electronic equivalents of the transfer of the integral value into storage and the maintenance thereof until the next integration period can be employed, if needed for a higher speed operation.

The operation of the circuit of FIG. 3 is considered to be clear from the foregoing description and by analogy to the detailed description of operation of the circuit of FIG. 2. With a low threshold and high sensitivity of the various transducers used to sense the process variables, a variational signal in each of the process variables will be detected at all times. In certain instances, however, it may be desired to ignore variational signals below a predetermined level which correspond to such small variations as do not seriously affect the quality or characteristics of the product being produced. Under such conditions it may be desirable to remove the regression signal control and operate on direct feedback error signal control. For this purpose circuits may be provided which automatically achieve this end. Such circuits in FIG. 3 comprise an OR circuit 161 having three inputs connected to the outputs of the correlators 138, 136, and 142. The OR circuit 161 is a well-known arrangement to produce an output on line 162 only if all of the inputs fall below a certain predetermined level. The output of OR circuit on 162 is fed to one of the inputs of an AND circuit 163 which also has an input from the error signal line 88. The AND circuit is also well known in the art and produces an output on line 164 only when input signals are present on both input lines. The signal on line 164 controls a gate 165 which passes the error signal from line 88 to line 166 only when the AND circuit 163 produces an output on line 164. The line 166 may feed a plurality of circuits 167, 168, 169, the outputs of which are connected to the respective process variable controllers. The devices 167, 168, 169 may be simply adjustable attenuators for apportioning the error signal from line 166, or they may be automatically controlled to apportion the error signal from line 166 in accordance with the last setting of the apportioning factors provided by the multiplier-divider units 149, 150, 151. With this portion of the circuit in operation, the decrease of all of the regression coefficients below a specified minimum value actuates the OR circuit 161 to produce an output on line 162. If an error signal is present on line 88 at this time the AND circuit 163 will be actuated to enable the gate 165 to pass the error signal to line 166. Thus, when an appreciable error signal exists but the correlation thereof with all of the controlled process variables is substantially zero, this error signal will nevertheless be applied by the units 167, 168, and 169 in any desired proportion to the controllers 125, 128, 133 as shown to continue the control of the process by feedback control.

Figure 5:
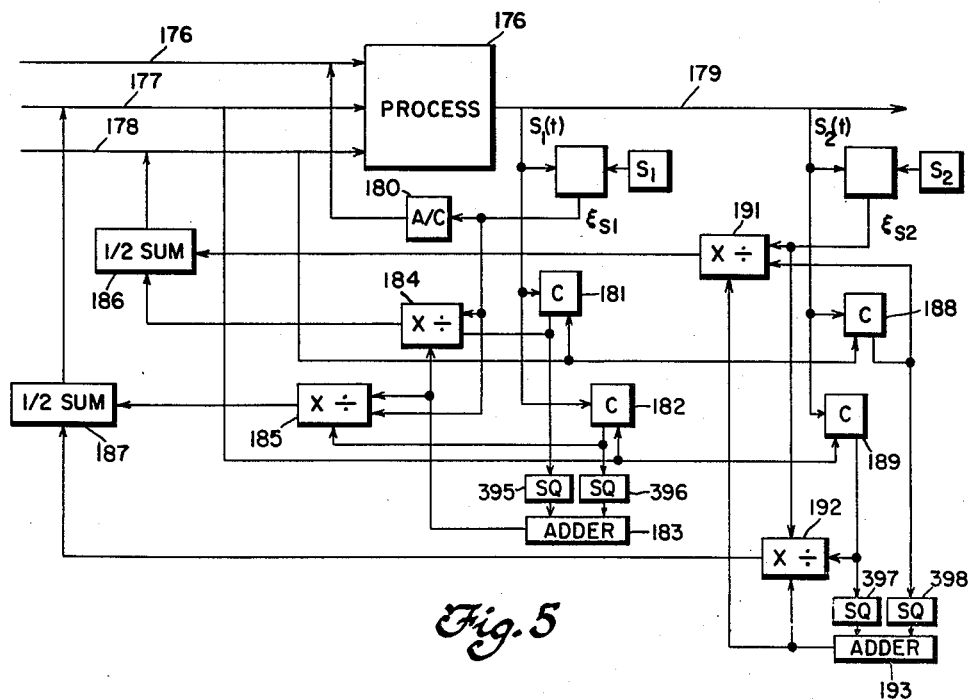
FIG. 5 is a block diagram of a process controller operating in response to sensing a plurality of process variables and a plurality of product properties.

In some complex processes it is necessary to monitor more than one product property in order adequately to control the process. In other processes, it may be desirable to monitor more than one product property and determine the correlation of each significant product property to the controlled process variables in order that the control of such variables may be optimized with respect to each product property. The system of FIG. 5 accomplishes this result by performing two independent regression-coefficient computations similar to that described for the system of FIG. 2, and distributing the corrections to the process input variables in accordance with the correlation results so computed. In the process shown in FIG. 5, a system 175 operates in response to a plurality of input variables 176, 177, 178 to produce an output product 179. The output product 179 is sensed to produce an error signal $\xi_{s_1}$ with respect to specification $S_1$ which error signal is applied to an automatic controller 180 for conventional feedback control of the input variable 176. The input variables 177 and 178 are sensed and the variational signals thereof applied respectively to regression computers 181, 182. This regression computation is with respect to the sensed value $S_1(t)$ of the product 179 which corresponds to specification $S_1$. The output of the regression computers 181, 182 is applied to squaring devices 395 and 396, respectively, and the resulting squares applied to an adder 183, the output of which serves as the divisor in division circuits 184, 185 while the circuits 184, 185 produce the product of the output of correlators 181, 182 and the error signal $\xi_{s_1}$ produced in relation to specification $S_1$. Thus, the output of each multiplier divider circuit 184, 185 is an apportioned error signal in accordance with the regression of the sensed product property on the sensed controlled input variables in precisely the same fashion described in relation to FIG. 2. This output is applied to half-sum circuits 186, 187 where it may be passed to control devices for control of the variables 177, 178 in the manner previously described in relation to FIG. 2. For controlling the variables 177, 178 with respect to two product properties, however, an additional circuit is provided which senses a property $S_2(t)$ of product of 179 with reference to a second specification $S_2$. This second property $S_2(t)$ of the product 179 is applied to regression computers 188, 189 which also receive the sensed values of the input variables 177, 178 to compute the regression coefficients. The error signal $\xi_{s_2}$ relative to specification $S_2$ is applied as a factor to multiplier-divider circuits 191, 192 and the regression coefficients from regression computers 188, 189 are also applied as factors to the circuits 191, 192. The regression coefficients from the computers 188, 189 are squared in devices 397 and 398, respectively, and the resulting squares applied to an adder 193 and the sum of the squared coefficients is applied as a divisor to the circuits 191, 192. Thus, the outputs of circuits 191, 192 are a pair of apportioned error signals divided in accordance with the ratio of the individual regression coefficients to the sum of the squares of the regression coefficients for the two sensed input variables 177, 178 correlated against the output property $S_2(t)$ relating to specification $S_2$. The outputs from circuits 191, 192 are applied to the half-sum circuits 186, 187 where the division of control between the two input signals thereto may be weighted in any desired manner for application back to the controlled variables 177, 178. As indicated, the weighting function for the two inputs to circuits 186, 187 may be of equal weight whereby the output of these circuits is one-half the sum of the input circuits. The system of FIG. 5 therefore provides a regression computation between a plurality of input variables and a plurality of output variables with the plurality of results so computed applied back in any desired manner of distribution to control the plurality of input variables. Obviously, this scheme could be extended for any desired number of input variables or any desired number of output variables which could be satisfactorily sensed as the product 179 is produced.

The delay $\tau$ in the cross-correlation computation may be introduced artifically or the signals derived directly from the sensing devices may be employed as received since the process variables signals produce a delayed response in the product property variables due to the quantity known in continuous processes as transportation lag. The transportation lag is the difference in time between the change applied to the input of one of the process variables and the resulting change detected in the product properties. Accordingly, if the present or real time signals are applied to the inputs of the multiplier or integrator circuits of the regression computers, a quantity is computed corresponding to the regression coefficient of the process variable function on the product property function delayed by the transportation lag.

Figure 6:
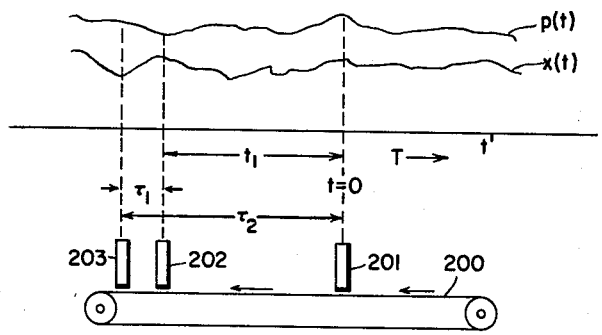
FIG. 6 is a timing diagram useful in understanding the relation between correlation delay and transportation lag.

The relation between transportation lag in an industrial process and the delay $\tau$ in the computation of the regression coefficient is presented in FIG. 6 with relation to a magnetic tape delay device such as disclosed in FIG. 2. FIG. 6 shows any controlled process variable $p(t)$ which is a function of time and any measured product property $x(t)$ which is also a function of time. The only measurable quantity of these functions is the present value thereof at time $t=0$. To indicate this condition diagrammatically, a recording tape 200 is driven at uniform speed in the direction indicated and the variables are recorded on the tape 200 by recording heads 201. As time progresses, the past value of $p(t)$ shown to the left of the line $t=0$ is presented successively to reading heads 202, 203. If the time of travel for the tape from recording head 201 to read head 203 is $\tau_2$, the signal sensed by read head 203 is $p(t-\tau_2)$. If this read head signal is applied to the correlator with the $x(t)$ signal, as sensed, the computation is made for the product.

$$p(t-\tau_2) \cdot x(t)$$

The correlation of this product relates what $p(t)$ was in the past with the present value of $x(t)$. From the definition of the transportation lag, $p(t)$ produces a result at some future time $(t+t')$ in the value of $x(t)$ at that time i.e., $x(t+t')$. Accordingly, if $\tau_2$ is selected to make $\tau$, the correlation delay, equal to $t'$, the transportation lag, the correlation computation will be performed with respect to a delay inherent in the system which will exhibit a correlation between the variables.

In some processes such as, for example, where a long delay is desired in the correlation computation, the correlation delay $\tau$ can be introduced in the product property variable $x(t)$ by recording $x(t)$ at recording head 201 and reading $x(t-\tau)$ at read head 203. The effective correlation delay for this arrangement is equal to the sum of tape delay and transportation lag, i.e., $\tau + t'$.

In some instances it may be desirable to record both sets of variables as shown in FIG. 2 which can be accomplished with another recording head 201 at the same position and another read head 202. The correlation delay $\tau_1$ in this arrangement will be, of course, equal to $(\tau_2 - t_1)$.

The cross-correlation of the present value of $p(t)$ and $x(t)$ may in specific applications provide significant control advantages since the result constitutes a partial autocorrelation function. In general $$x(t) = g(t) \cdot p(t-\tau)$$

where $g(t)$ is the function other than $p(t)$ which influences $x(t)$. Thus:

$$Sp(t) \cdot x(t) dt = Sp(t) \cdot p(t-\tau) \cdot g(t) dt$$

If the effect of $g(t)$ on the value of this integral is known as where $g(t)$-constant, the integration of the present values of $p(t)x(t)$ produces the integral for the autocorrelation function of $p(t)$ with delay $\tau$ equal to the transportation lag.

The present invention may be embodied in many forms which can differ from the preferred embodiments disclosed. By the computation of the cross-correlation functions and/or the regression coefficients of the various variables involved in the process for adjustable delay times the best correlation for maintaining uniform quality may be obtained. In particular instances where the transportation lag provides the delay time, the variables will be correlated with respect to the delay between the functions which is inherent in the system, thus taking advantage of this inherent delay in response to input signals in developing the input signals to be applied.

Many embodiments and adaptations of the invention as disclosed will be apparent to those skilled in the art and are to be considered within the scope of the appended claims.

I claim:
1. An industrial process control system comprising a plurality of controlled process variables for controlling the characteristics of the product produced by said process, means for sensing at least one of said characteristics of said product, means responsive to said sensing means and a standard for said characteristic for generating an error signal, means for sensing at least two of said process variables, means for computing the regression coefficient of said characteristic on each sensed process variable, means for applying corrections to said sensed process variables, and means for distributing corrections among the process variables in accordance with said error signal and the regression coefficient between said variables and said characteristics.

2. Apparatus according to claim 1 in which corrections are applied to each sensed process variable proportional to the product of said error signal and the ratio of each respective regression coefficient to the sum of the squares of the regression coefficients for all of said sensed process variables.

3. An industrial process control system comprising a plurality of controlled process variables for controlling the characteristics of the product produced by said process, means for sensing at least one of said characteristics of said product, means responsive to said sensing means and a standard for said characteristic for generating an error signal, means for sensing at least two of said process variables, means responsive to the sensed values of said variables and the sensed value of said characteristic for periodically computing the regression coefficients between each of said variables and said characteristic, means for storing discrete values of said computed regression coefficients at the end of each periodic computation, means for applying corrections to said sensed process variables, and means for distributing corrections from said discrete values in storage among said process variables in accordance with said error signal and the respective regression coefficient between said variables and said characteristic.

4. An industrial process control system comprising a plurality of controlled process variables for controlling the characteristics of the product produced by said process, means for sensing at least one of said characteristics of said product, means responsive to said sensing means and a standard for said characteristic for generating an error signal, means for sensing at least two of said process variables, means responsive to the sensed values of said variables and the sensed value of said characteristic for computing the regression coefficient between each of said variables and said characteristic, means for applying corrections to said sensed process variables, normally operative means for distributing corrections among the process variables in accordance with said error signal and the respective regression coefficient between said variables and said characteristic, normally inoperative means for controlling at least one of said variables in accordance with said error signal, and means responsive to all of said regression coefficients having values below a predetermined threshold for interrupting said normally operative means and making operative said normally inoperative means for the control of said process.

5. An industrial process control system comprising a plurality of controlled process variables for controlling the characteristics of the product produced by said process, means for sensing a plurality of said characteristics of said product, means responsive to said sensing means and respective standards for said characteristics for generating a plurality of error signals, means for sensing a plurality of said process variables, means responsive to the sensed values of said variables and the sensed values of said characteristics for computing regression coefficients between each of said sensed values and characteristics, means for applying corrections to said sensed process variables, and means for distributing corrections among the process variables in accordance with a predetermined combination of said error signals and the respective regression coefficients between said variables and said characteristics.

6. Apparatus according to claim 5 and including means responsive only to one of said error signals for controlling one of said process variables.

References Cited in the file of this patent
UNITED STATES PATENTS
2,712,414     Zieboltz                July 5, 1955

OTHER REFERENCES
Amber, G. H., and Amber, P. S.: "Special Purpose Computers in the Control of Continuous Processes" (Automatic Control, May 1958) pp. 43, 45, 46, 47.

Chelustkin, A. B.: "Design and Application of Correlation Control" (Automatic Control, May 1958) pp. 16–18.